Dec. 19, 1933.                S. J. NOGOSEK                1,939,720
                    AUTOMATIC SYSTEM OF MOTOR CONTROL
                          Filed June 30, 1932

Inventor
Stephen J. Nogosek
By
Arthur R. Woofolk
              Attorney

Patented Dec. 19, 1933

1,939,720

UNITED STATES PATENT OFFICE 1,939,720

AUTOMATIC SYSTEM OF MOTOR CONTROL

Stephen J. Nogosek, West Allis, Wis., assignor to Square D Company, Detroit, Mich.

Application June 30, 1932. Serial No. 620,057

4 Claims. (Cl. 172—274)

This invention relates to an automatic system of motor control and is particularly applicable to a system for controlling a stoker motor, although the invention is not limited to such a use and is applicable to a variety of other uses, as will appear as the invention is described.

In stoker motor control systems it is the usual practice to provide a manual control which may be set to govern the speed of the stoker motor and it sometimes happens that the stoker motor stalls in case of a momentary overload due to a large piece of coal or similar obstacle getting into the feed while the motor is being operated at low speed.

This invention is designed to overcome the above noted defects, and objects of this invention are to provide a novel system of motor control which, although the motor is set to operate at a low speed and is actually so operating, that even when a large chunk of coal or other obstacle gets into the feed and thereby overloads the motor and tends to stall it, that nevertheless means are provided which automatically increase the torque, thus allowing the motor to overcome the temporary overload due to the large chunk of coal or other obstacle and incidentally to attain the speed for which it was set, such action persisting for a predetermined adjustable length of time, and thereafter ceasing after the motor has overcome the temporary unusual load, the system operating in a wholly automatic manner without the intervention of the operator.

Further objects are to provide a system of motor control which is very simple, which may be applied to existing installations with a minimum of change, which is thoroughly reliable in operation, and which does not require the use of delicate or fragile constructions, but on the other hand employs apparatus which is substantially foolproof and is not likely to get out of order.

In greater detail objects of this invention are to provide a system of motor control in which a speed regulator may be set at any desired speed for the motor, but in which when the motor becomes overloaded, the increase in voltage of the wound rotor due to the decrease in speed of the motor is utilized to operate an automatic timing system which actuates a resistance short-circuiting contactor and holds the contactor closed for a predetermined and adjustable interval of time, thereafter opening the contactor automatically and restoring the resistance in the rotor circuit to its initial value.

An embodiment of the invention is shown in the accompanying drawing, in which.

Figure 1:
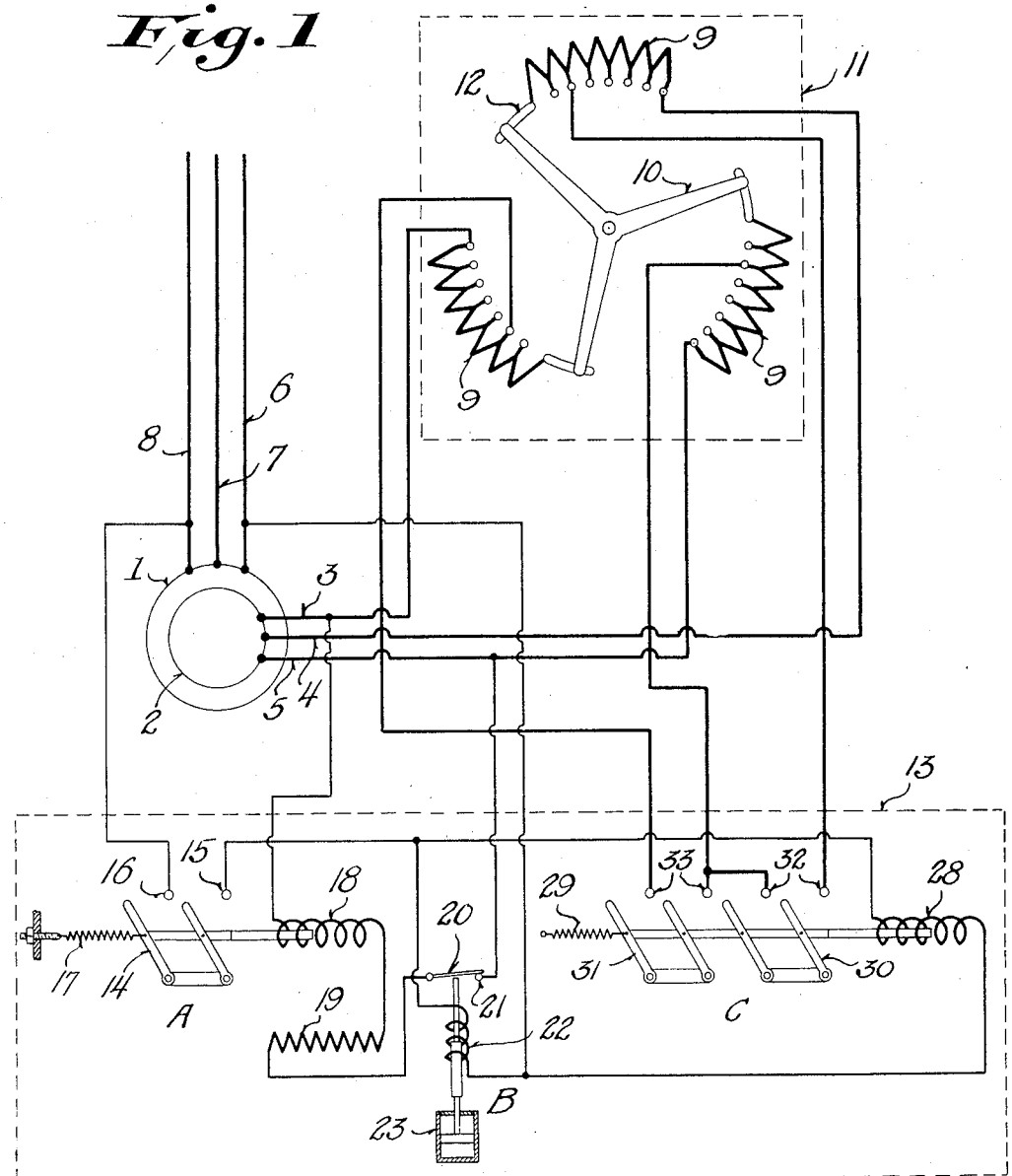
Figure 1 is a diagrammatic view of the motor control system.

Referring to the drawing, it will be seen that the stoker or other motor has its stator indicated by the reference character 1, and its rotor by the reference character 2. This motor is an alternating current motor, preferably polyphase, and has a wound rotor and is provided with slip rings connected to the leads 3, 4 and 5 respectively. The incoming leads which supply the stator of the motor are indicated by the reference characters 6, 7 and 8.

The leads or conductors 3, 4 and 5 are respectively connected to one end of three resistances 9. These resistances are adapted to have their other ends or any intermediate portion thereof connected by means of the spider-shaped contactor arms 10 of the manually or otherwise adjustable speed regulator. The speed regulator may be a unit mounted upon a separate panel, as indicated by the reference character 11, and may be located at any desired point.

It is preferable to provide an elongated contact 12 at the end of each resistance 9 opposite that connected to the leads 3, 4 and 5 respectively, so that the rotor windings are always connected irrespective of the setting of the speed regulator.

It is clear that as the speed regulator is turned in a clockwise direction, that the resistance in the rotor circuit is decreased, consequently increasing the normal speed of operation of the motor.

When the motor is set at its lowest speed, or at a speed near its lowest speed, it is clear that if it is momentarily overloaded, as for instance when it is driving a stoker mechanism and the stoker mechanism is obstructed by a relatively large piece of coal, that the motor will stall. Therefore, means are provided by this invention for short-circuiting a portion of each of the resistances 9 in an automatic manner and for a predetermined adjustable length of time.

This automatic speed control mechanism is preferably mounted on a panel 13 and may be located at any suitable point either remote from the other portions of the apparatus or adjacent the speed regulator, if so desired.

The automatic control device comprises a voltage relay indicated generally by the reference character A, a timing relay indicated generally by the reference character B, and a resistance short-circuiting contactor indicated generally by the reference character C.

The voltage relay comprises a pair of electrically connected contactor arms 14 which are normally held out of contact with the stationary contacts 15 and 16 by means of the adjustable spring 17. These arms are drawn into engagement with the stationary contacts 15 and 16, to thereby bridge such contacts, by means of the energizing coil 18. This coil 18, or closing magnet, is connected to one of the leads from the rotor, for instance the lead 3, as indicated, and is connected through a resistance 19 to another lead from the rotor, for instance the lead 5. However, the circuit of the holding coil or closing magnet 18 has interposed therein the switch or contacts 20 and 21 of the timing relay B, this timing relay normally being in closed position and operating only when its opening magnet or coil 22 is energized.

The action of this timing relay is delayed. It may be delayed in any suitable manner, as by means of the dashpot 23.

Figure 2:
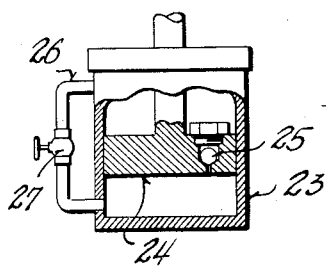
Figure 2 is a fragmentary view, somewhat diagrammatic, showing a detail of the dashpot or other timing device.

Figure 2 shows one of many ways for securing a delayed action of the timing relay. It will be seen that a piston 24 operated by the relay is mounted within the dashpot 23 and is provided with a check valve 25 allowing a quick downward motion, but preventing a quick upward motion of the piston. However, the space above and below the piston is placed in communication by any suitable means, as by means of the pipes 26 and the adjustable valve 27, so that the timing of the relay may be varied and the opening of its contacts 20 and 21, see Figure 1, may occur after any predetermined interval of time whenever the coil 22 is energized.

The resistance short-circuiting contactor C is biased to open position but is moved to closed position by means of the closing magnet or coil 28, see Figure 1. It is biased towards open position by gravity, or by means of a spring 29, as indicated. This resistance short-circuiting contactor comprises a plurality of pairs of contact arms 30 and 31 electrically connected and adapted to connect the stationary contacts 32 and 33 respectively when the contactor is moved to closed position.

The two center contacts are connected so that in effect there are three active stationary contacts in the contactor. These contacts are connected to intermediate points of the resistances 9, so that when the contactor closes, a predetermined portion of each of the resistances 9 is short-circuited out and consequently the motor speed is increased.

The coils 22 of the timing relay and 28 of the resistor short-circuiting contactor are connected in parallel or in series and are connected to the supply mains 6 and 8. However, this circuit is normally open as it terminates at the stationary contacts 15 and 16 of the voltage relay. The circuit is completed, however, whenever the voltage relay closes, bridging the contacts 15 and 16, thereby energizing the coils 22 and 28.

The operation of the apparatus is as follows: Whenever the motor is momentarily or temporarily overloaded in any manner, as for instance that previously described, the rotor slows up and the voltage across the rotor windings increases. This voltage is impressed upon the voltage relay A and overcomes the action of the spring 17.

The voltage relay thus closes and completes the circuits of the coils 22 and 28. The timing relay B does not immediately function due to the delay mechanism previously described, but the resistance short-circuiting contactor C immediately short-circuits a portion of each of the resistances 9, thereby increasing the speed and power of the motor. The motor therefore overcomes the temporary overload. However, it does not continue to operate at its increased speed, due to the fact that the timing relay comes into play and opens the circuit of the voltage relay. The voltage relay then snaps open, thereby opening the circuit of the coils 22 and 28 and allowing the parts to come to their initial position.

It is to be noted that the resistance 19 is connected in series with the coil 18 of the voltage relay. The purpose of this resistance is to minimize or greatly lessen the effect of the variable frequency upon the voltage relay. It is to be noted that the speed of the rotor varies considerably, and that, therefore, the frequency of the current flowing through the coil 18 of the voltage relay also varies widely. The effect of this variation, however, is minimized by placing a resistance in series with the coil 18, as it makes the current in the circuit, including the coil 18 and the resistance 19, vary substantially strictly in accordance with voltage variations, thereby securing a relay responsive to voltage variations, irrespective of frequency variations.

It is to be distinctly understood, if it is found desirable in certain installations of the device, that the check valve 25 of the dashpot mechanism may be omitted and the time relay could therefore have a slow return motion as well as a slow upward motion to thereby allow sufficient time delay for the motor to slow up even if it became only very slightly loaded after the temporary overload had been overcome.

It will be seen that a very simple type of motor control device and a very simple motor control system has been provided by this invention which fulfills an active demand in a satisfactory and simple manner.

Although this invention has been described in considerable detail, it is to be understood that such description is intended as illustrative rather than limiting, as the invention may be variously embodied and is to be interpreted as claimed.

I claim:

1. A system of motor control comprising an alternating current motor having a stator and a wound rotor, circuits connected to said wound rotor and provided with reactance producing means, and means responsive to the voltage generated in the rotor for varying the effect of the said reactance producing means, said last mentioned means restoring the reactance producing means to its initial value after a predetermined interval of time.

2. A system of motor control comprising an alternating current motor having a stator and a rotor provided with circuits, and means responsive to variations in the voltage generated in the rotor for varying the reactance of certain of said circuits in inverse relation to the voltage generated in the rotor, said means restoring the said circuits to their initial condition a predetermined time after each operation.

3. A system of motor control comprising an alternating current motor having a stator and a wound rotor, circuits connected to said rotor and including resistance elements, a voltage relay connected to said rotor, a resistance short-circuiting device controlled by said relay for short-circuiting a portion at least of said resistance elements, and a time delay relay energized when said voltage relay operates for deenergizing said resistance short-circuiting device after a predetermined interval of time.

4. A system of motor control comprising an alternating current motor having a stator and a wound rotor, circuits including resistance elements connected to said rotor, a voltage relay connected to said rotor and closing when the voltage in said rotor reaches a predetermined value, a device controlled from said voltage relay for short-circuiting a portion of said resistance elements when the voltage relay closes, and a time delay relay controlled from said voltage relay for rendering said short-circuiting device inoperative a predetermined interval after said voltage relay operates.

STEPHEN J. NOGOSEK.